United States Patent [19]

Ishii

[11] Patent Number: 4,720,803

[45] Date of Patent: Jan. 19, 1988

[54] DISPLAY CONTROL APPARATUS FOR PERFORMING MULTICOLOR DISPLAY BY TILING DISPLAY

[75] Inventor: Takatoshi Ishii, Tokyo, Japan

[73] Assignee: Kabushiki Kaisha Toshiba, Kawasaki, Japan

[21] Appl. No.: 850,086

[22] Filed: Apr. 9, 1986

Related U.S. Application Data

[63] Continuation of Ser. No. 608,193, May 8, 1984, abandoned.

[30] Foreign Application Priority Data

May 13, 1983 [JP] Japan .................................. 58-82547
May 13, 1983 [JP] Japan .................................. 58-82548

[51] Int. Cl.[4] ........................ G06F 15/40; G09G 1/14; G09G 1/28

[52] U.S. Cl. .................................... 364/521; 364/518; 340/750; 340/720; 340/703

[58] Field of Search ................ 364/518, 521; 340/720, 340/728, 729, 747, 750, 729; 358/283; 340/703

[56] References Cited

U.S. PATENT DOCUMENTS 4,149,183 4/1979 Pellar et al. ........................ 358/283
4,196,451 4/1980 Pellar .................................. 358/283
4,352,105 9/1982 Harney .......................... 340/703 X
4,354,186 10/1982 Groothius ...................... 340/703 X
4,464,676 8/1984 Russell et al. ........................ 340/793
4,486,785 12/1984 Lasher et al. ........................ 340/793
4,511,965 4/1985 Rajaram ............................. 340/750
4,516,118 5/1985 Wahlquist ........................... 340/703
4,532,503 7/1985 Pennebaker ......................... 358/283
4,656,596 4/1987 Thaden et al. ....................... 364/521

*Primary Examiner*—Errol A. Krass
*Assistant Examiner*—Joseph L. Dixon
*Attorney, Agent, or Firm*—Cushman, Darby & Cushman

[57] ABSTRACT

A display control apparatus has a memory for storing luminance data corresponding to a plurality of color elements for color display, the luminance data being used as display data of dots to be displayed at a raster scan type display unit, a circuit for reading out the luminance data corresponding to the respective color elements of given dots for dot display at the display unit, and a video signal converter for enabling/disabling at least one-dot display intervals a binary video signal which is to be transmitted to the display unit and corresponds to a color element when specific luminance data of this color element read out from the memory by the readout circuit has a given level for an interval corresponding to at least two dots along a raster direction, and for transmitting the luminance data to the display unit in accordance with the enable/disabled state of the binary video signal.

5 Claims, 28 Drawing Figures

FIG. 7A DCLK

FIG. 7B HCLK

FIG. 7C DLCLK

FIG. 7I C-VDO

DISPLAY CONTROL APPARATUS FOR PERFORMING MULTICOLOR DISPLAY BY TILING DISPLAY

This is a continuation of application Ser. No. 608,193, filed May 8, 1984, which was abandoned upon the filing hereof.

BACKGROUND OF THE INVENTION

The present invention relates to a display control apparatus for providing a plurality of color element data signals at a display unit having an interface coupled to binary video signal lines.

A conventional color display monitor used as a standard terminal device of a personal computer or the like has an interface coupled to three video signal lines for transmitting color element data signals of R (red), G (green) and B (blue) in the form of binary data. Since only a data signal of logic "0" or "1" is supplied to each of the signal lines, a multicolor display of a maximum of 8 colors ($2^3$) can be performed with the R, G and B color signals.

A conventional personal computer which allows multicolor display of 8 or more colors is already commercially available. However, in this case, a standard display monitor having an interface with binary color signal lines cannot be used. In order to perform multicolor display of more than 8 colors, a video signal line for transmitting the luminance signal may be added. In this case, a luminance signal of logic "1" represents high luminance, and a luminance signal of logic "0" represents low luminance, thereby providing a 16-color display. Alternatively, three video signal lines of R, G and B color elements are added to provide 4-level gradation of each color element, thereby providing a 64-color display. In addition to these arrangements, the video signal is converted to an analog signal to transmit luminance data in accordance with the magnitude of the analog signal. However, these conventional methods require a color display monitor having a special interface and a signal cable compatible with this special interface.

SUMMARY OF THE INVENTION

It is an object of the present invention to provide a display control apparatus for enabling/disabling each of binary color signals transmitted to n digital video signals at at least one-dot display intervals to transmit luminance data and for performing tiling display on a screen, thereby providing $2^n$-color display.

It is another object of the present invention to provide a display control apparatus wherein when luminance data is transmitted by enabling/disabling each of binary color signals at at least one-dot display intervals so as to perform tiling display, the enabling/disabling position changes for every horizontal raster and/or vertical frame, thereby averaging the influence of enabling/disabling of the color signal.

It is still another object of the present invention to provide a display control apparatus for performing multicolor display of a larger number of colors by changing the enabling period of the binary color signal which lasts for at least a one-dot display period.

It should be noted that "tiling display" is defined such that various colors are arranged in a mosaic manner to cause the observer to visually observe a specific color from a remote position, thereby providing a multicolor display.

In order to achieve the above objects of the present invention, there is provided a display control apparatus comprising:

memory means for storing luminance data respectively corresponding to a plurality of color elements subjected to color display, the luminance data serving as dot data to be displayed at a raster scan type display unit;

readout means for reading out from said memory means the luminance data corresponding to the color element of a given dot of the dot data when dot display is performed at said display unit; and video signal converting means for enabling/disabling a binary video signal at at least one-dot display intervals corresponding to display timings, the binary video signal being transmitted to said display unit so as to represent a display of one color element, when at least two consecutive dots along the raster direction present the same specific luminance data of said one color element.

According to the present invention, even if a display unit has an interface for n binary video signals, a multicolor display of more than $2^n$ colors can be performed. In addition, the luminance component is transmitted by enabling/disabling the binary video signal at at least one-dot display intervals. Therefore, the fundamental frequency of the video signal will not be increased, and hence the present invention can be effectively utilized in high-resolution display.

BRIEF DESCRIPTION OF THE DRAWINGS

Other objects and features of the present invention will be apparent from the following descriptions of the accompanying drawings as summarized below:

FIGS. 3A through 3F show a timing chart for explaining the operation of a video signal converter in the apparatus shown in FIG. 1, in which FIG. 3A shows a signal DCLK obtained by frequency-dividing a reference clock supplied from an oscillator, FIG. 3B shows a signal HCLK obtained by frequency-dividing the signal DCLK by two, FIGS. 3C and 3D show blue video signals BLUE1 and BLUE0, respectively, FIG. 3E shows an output signal S from an OR gate 223, and FIG. 3F shows an output signal BL-VDO from the video signal converter;

FIGS. 5A through 5F show a timing chart for explaining the operation of the video signal converter according to the second embodiment, in which FIG. 5A shows a signal DCLK obtained by frequency-dividing a reference clock supplied from an oscillator, FIG. 5B shows a signal HCLK obtained by frequency-dividing the signal DCLK by two, FIGS. 5C and 5D show 2-bit luminance signals C1 and C0, respectively, FIG. 5E shows an output signal S from an OR gate 223, and FIG. 5F shows an output signal C-VDO from the video signal converter of the second embodiment;

FIGS. 7A through 7I show a timing chart for explaining the operation of the video signal converter according to the third embodiment, in which FIG. 7A shows a signal DCLK obtained by frequency-dividing a reference clock supplied from an oscillator, FIG. 7B shows a signal HCLK obtained by frequency-dividing the signal DCLK by two, FIG. 7C shows a signal DLCLK obtained by delaying the signal DCLK, FIGS. 7D and 7E show 2-bit luminance signals C1 and C0, respectively, FIGS. 7F through 7H show output signals S1, S2 and S3 generated from an OR gate 69, a flip-flop 70 and a flip-flop 67, respectively, and FIG. 7I shows an output signal C-VDO from the video signal converter of the third embodiment;

DETAILED DESCRIPTION OF THE PREFERRED EMBODIMENTS

Figure 1:
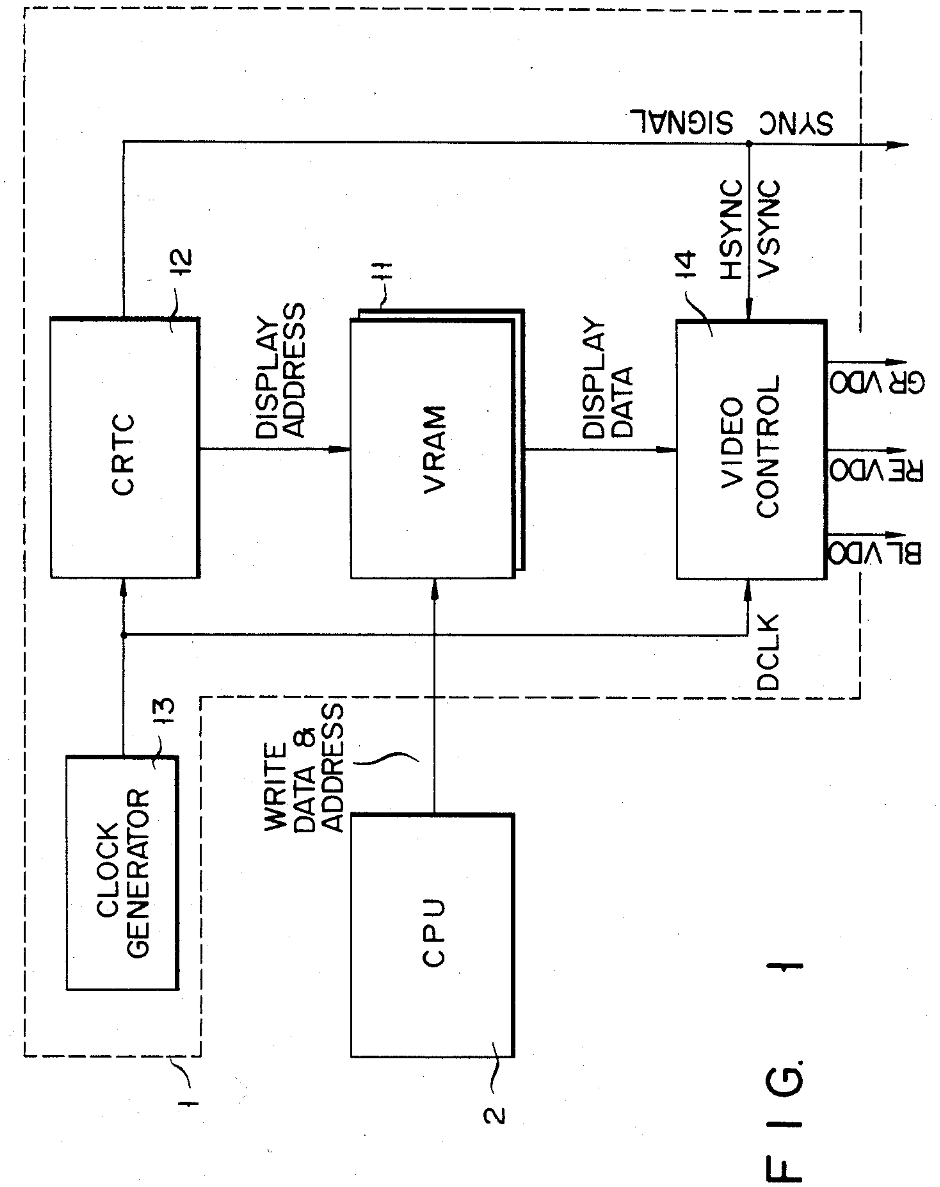
FIG. 1 is a block diagram of a display control apparatus according to an embodiment of the present invention.

FIG. 1 is a block diagram of a display control apparatus according to the present invention. The display control apparatus 1 has a pattern refresh type video RAM (VRAM) 11 for storing display data. The VRAM 11 comprises memory areas of 6 planes which have the same addresses. Each of the memory areas has a memory capacity which is equal to a total number n of display dots of a display unit (not shown). A CRT controller (CRTC) 12 comprises a special LSI controller for controlling a raster scan type CRT. The basic functions of the CRTC 12 include generation of horizontal/vertical synchronizing signals (SYNC SIGNAL), readout of display data from the VRAM 11 in response to the refresh address signals supplied thereto, cursor control, and control of light pen detection. The CRTC 12 comprises, for example, a one-chip LSI HD46505S. The functions and the internal circuit arrangement of this chip are described in Hitachi Semiconductor Data Book 8/16-Bit Microcomputer (September, 1982) pp. 662–686. Any other commercially available one-chip CRT controller may also be used as the CRTC 12. The CRTC 12 supplies display address signals to the VRAM 11 so as to read out display data (representing the current scan position) from the VRAM 11 in synchronism with raster scanning at the display unit. A clock generator 13 comprises an oscillator and a dot counter for frequency-dividing a reference signal generated from the oscillator to generate a dot clock signal DCLK. The CRTC 12 generates horizontal/vertical sync signals (HSYNC and VSYNC) by using the signal DCLK generated from the clock generator 13. The display data read out from the VRAM 11 is supplied to a video control circuit 14.

The VRAM 11 comprises a 6-plane memory. One-word length display data is read out from the memory area of each plane. The signals DCLK, HSYNC, and VSYNC are supplied to the video control circuit 14. In practice, the video control circuit 14 also receives control signals such as an attribute display control signal (e.g., blink display) and a cursor display timing signal from the CRTC 12. However, these control signals are not directly concerned with the scope of the present invention, and a detailed description will thus be omitted. The video control circuit 14 generates binary video signals RE-VDO, BL-VDO and GR-VDO respectively corresponding to three red (RE), blue (BL) and green (GR) primary color elements.

The display data is written in the VRAM 11 in response to the data and address signals supplied from a central processing unit (CPU) 2. In general, writing in the VRAM 11 under the control of the CPU 2 is performed at specific timings (e.g., horizontal and vertical blanking periods) so as not to cause contention with data access by the CRTC 12.

Figure 2:
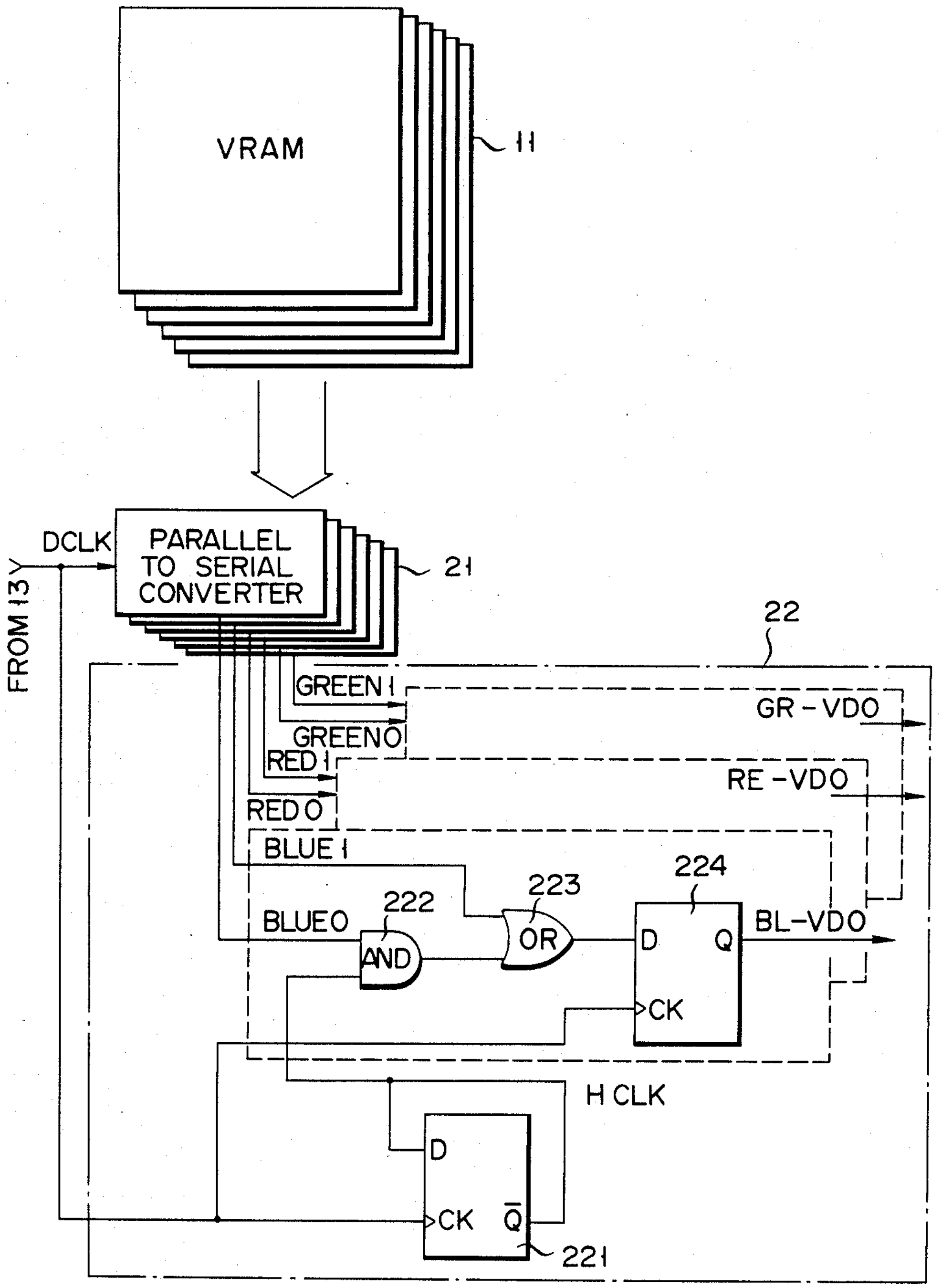
FIG. 2 is a block diagram of a video control circuit of the apparatus shown in FIG. 1.

The arrangement of the video control circuit 14 in the display control circuit 1 which is exemplified as the main feature of the present invention will be described in detail. FIG. 2 is a block diagram of the video control circuit 14. The video control circuit 14 comprises a parallel-to-serial converter 21 for converting the parallel data which is read out from the VRAM 11 to serial data, and a video signal converter 22 for enabling/disabling (to be referred to as dot-skipping hereinafter) the digital video signal of each color at one-dot display intervals in correspondence with luminance data in accordance with the output from the parallel-to-serial converter 21. The converter 21 comprises six shift registers respectively having the bit configuration same as the word length of the six planes of the VRAM 11. The respective shift registers receive the parallel display data read out from the VRAM 11 in units of characters (i.e., 8 dots) and shift the input data at intervals corresponding to the one-dot display interval, thereby converting the parallel data to serial data. An output from the converter 21 comprises 6-bit data. Two bits of the 6-bit data are assigned to the RE; another two thereof to the BL; and the remaining two thereof to the GR color elements. In other words, every two of the six planes in the VRAM 11 are assigned to two corresponding bits of the 6-bit data. The resultant signals are called GREEN1 and GREEN0, RED1 and RED0, and BLUE1 and BLUE0. Therefore, a maximum of 4 luminance levels can be obtained for each primary color. In this embodiment, the video signal converter 22 is arranged to perform 3-level display of the respective primary colors. The internal circuit configuration of the video signal converter 22 will now be described in detail. A circuit (surrounded by a dotted line) in the video signal converter 22 is provided for each primary color. By way of simplicity, only a blue video signal (BD-VD0) generator circuit is illustrated in FIG. 2.

A signal DCLK is supplied to a clock terminal CK of a D flip-flop (FF) 221. A $\overline{Q}$ output from the FF 221 is fed back to its D input terminal. This connection causes the FF 221 to serve as a binary counter. Therefore, the $\overline{Q}$ output HCLK from the FF 221 becomes a signal obtained by frequency-dividing the signal DCLK by two. The signal HCLK is supplied to an AND gate 222. The AND gate 222 also receives the signal BLUE0. An output from the AND gate 222 is supplied to an OR gate 223. The OR gate 223 also receives the signal BLUE1. An output S from the OR gate 223 is supplied to the D input terminal of an FF 224. The signal DCLK is supplied to a clock terminal CK of the FF 224. Therefore, the value of the output S at the leading edge of the signal DCLK appears as BL-VD0 at the Q output terminal of the FF 224.

FIGS. 3A to 3F show a timing chart for explaining how the luminance data is transmitted in the form of a binary signal. In this embodiment, tri-state luminance data (0,0), (0,1) and (1,X) where X is logic "0" or "1" are used to express 3-level gradation.

Figures 3A, 3B, 3C, 3D, 3E, 3F:
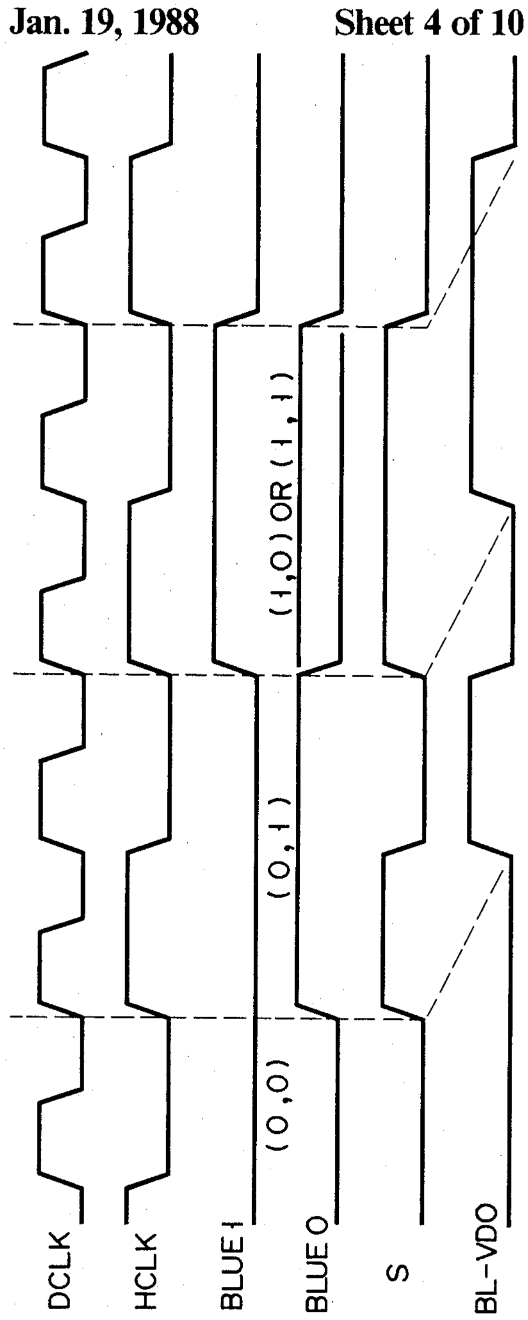

When (BLUE1,BLUE0)=(0,0) as shown in FIGS. 3C and 3D, the signal S shown in FIG. 3E is set at logic "0", and the Q output (i.e., signal BL-VD0) from the FF 224 is also set at logic "0".

When the state (BLUE1,BLUE0)=(0,1) continues for longer than a 2-dot period, the AND gate 222 generates a logic product while the signal HCLK shown in FIG. 3B is held at logic "1". Therefore, the signal S is set at logic "1" while the signal HCLK is held at logic "1". When the signal DCLK of FIG. 3A rises while the signal S is set at logic "1", the Q output from the FF 224 is set at logic "1". However, since the signal S is set at logic "0" when the signal DCLK rises the next time, the Q output from the FF 224 goes logic "0". Therefore, when the state (BLUE1,BLUE0)=(0,1) continues for longer than two dot clocks, dot skipping is performed at one-dot clock intervals. This signal supplied to the display unit and the color element corresponding to this signal are displayed at one-dot intervals. The displayed point is very small. When the operator visually observes this point at a remote location, the average luminance is lowered, and the point is recognized as a spot with intermediate luminance.

When the state (BLUE0,BLUE1)=(1,0) or (BLUE1,BLUE0)=(1,1) continues for longer than 2 dot clocks, the signal S is kept at logic "1" for a 2-dot display interval since the signal BLUE1 is set at logic "1". Therefore, when the signal DCLK rises after the 2-dot clock interval, the signal S is set at logic "1". The signal BL-VD0 is thus set at logic "1" for longer than the 2-dot display interval. When this signal is supplied to the display unit, the operator visually observes a bright spot.

In the manner described above, the luminance data can be transmitted by dot skipping of the binary video signals. In this embodiment, each of the color signals can be represented with 3-level gradation, so that 27 ($=3^3$) colors can be displayed even if only three binary video signals of RE, BL and GR components are used.

Figure 2A:
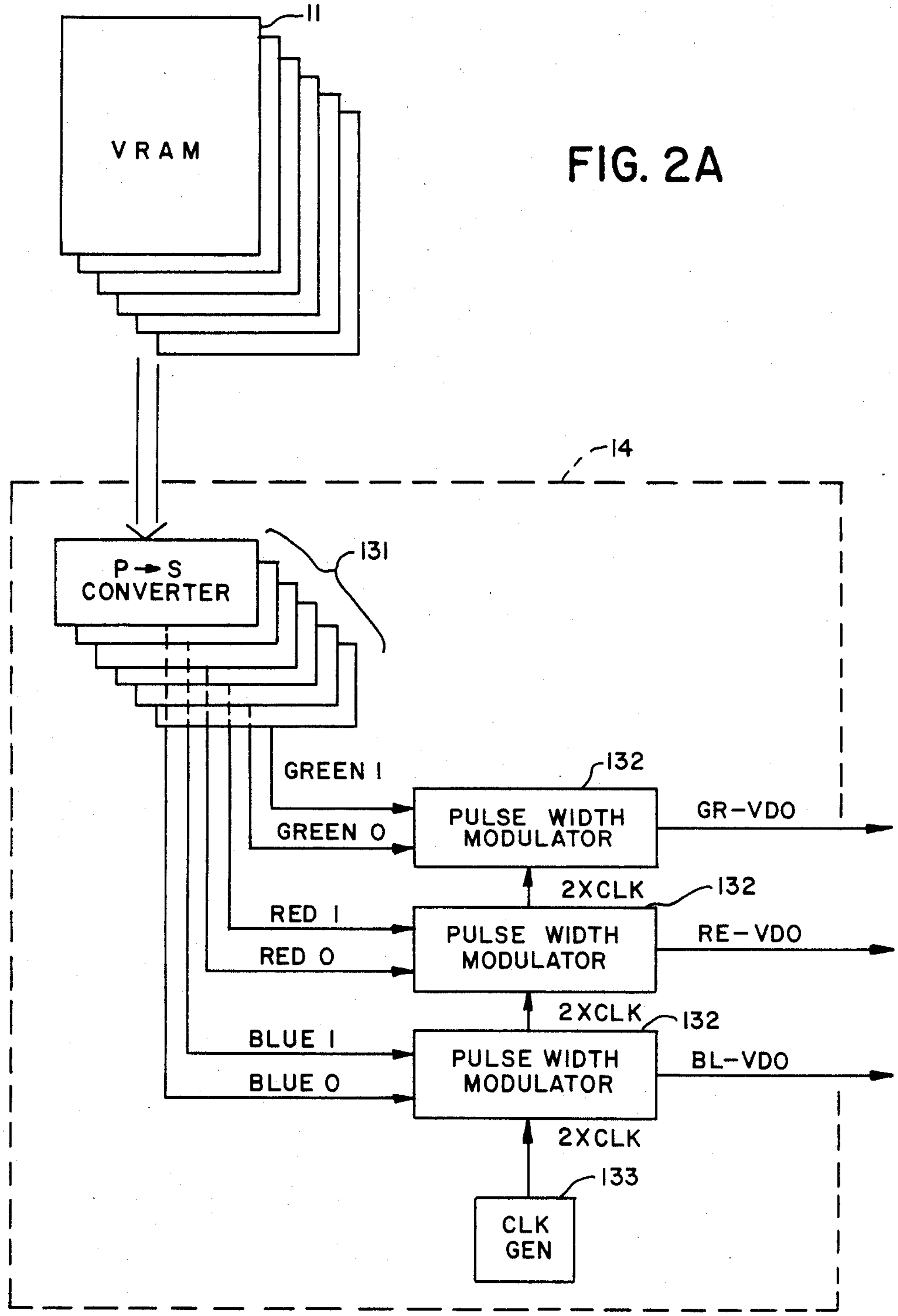
FIG. 2A is a block diagram of another embodiment of FIG. 2

FIG. 2A shows a modified form of the invention in which the pulse widths of the binary video signals from parallel to serial converter 131 are controlled by modulators 132 in order to display at least one color element at a prescribed dot of the screen in accordance with the luminence data of the color element read by memory 11. Modulators 132 are driven a conventional clock generator 133.

Figure 4:
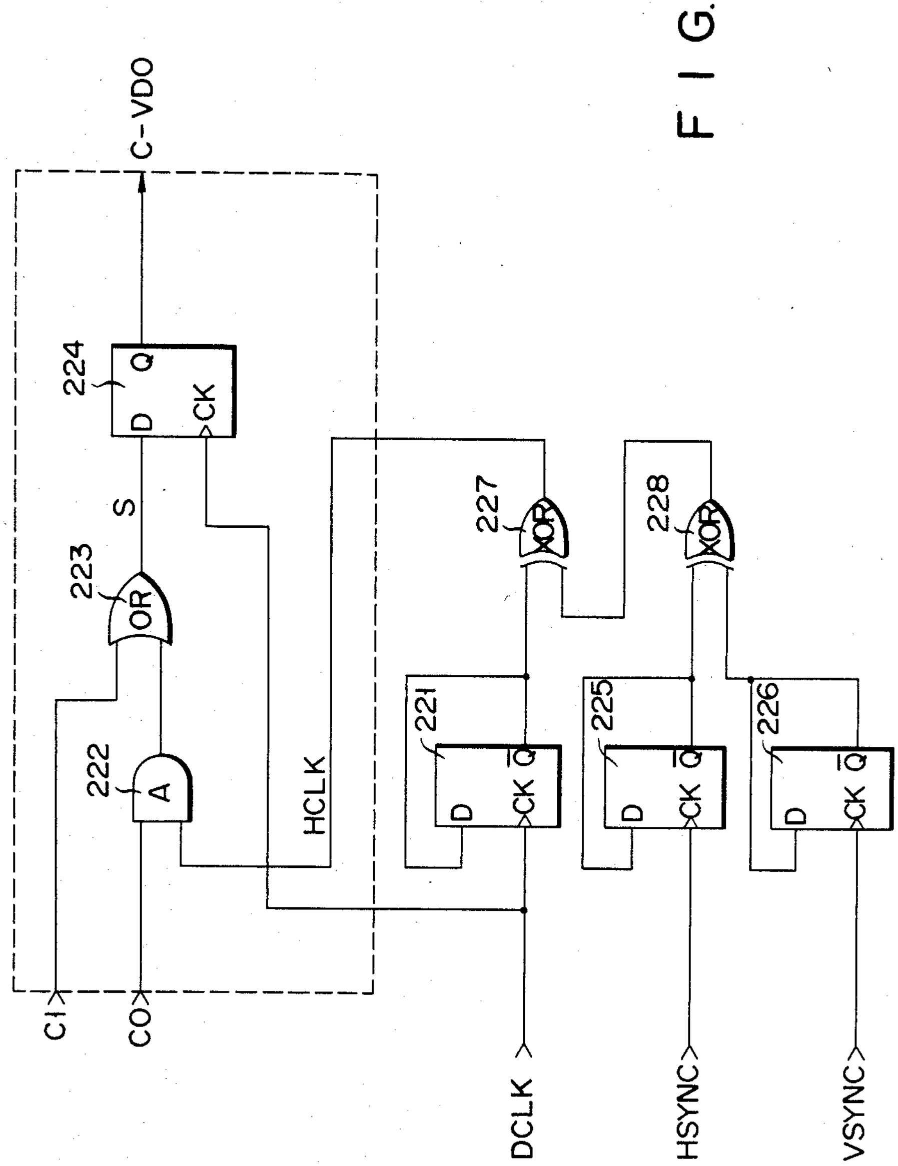
FIG. 4 is a circuit diagram of a video signal converter of a display control apparatus according to a second embodiment of the present invention.
Figures 5A, 5B, 5C, 5D, 5E, 5F:
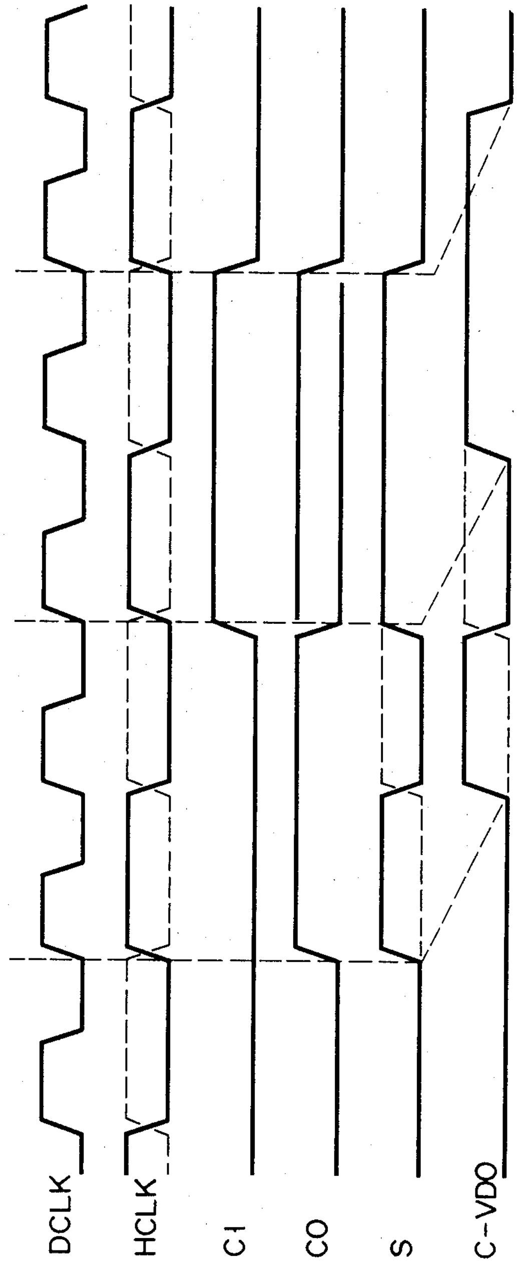

A second embodiment is shown in FIG. 4.

FIG. 4 is a circuit diagram of a video signal converter corresponding to the video signal converter 22 shown in FIG. 2. The converter surrounded by the dotted line is also provided for each color element. Referring to FIG. 4, 2-bit luminance data for the respective color elements are given to be C1 and C0. The binary signal output is given to be C-VD0. The same reference numerals used in FIG. 4 denote the same parts as in FIG. 2.

The circuit shown in FIG. 4 is an improved arrangement of the circuit shown in FIG. 2, such that D flip-flops (FF) 225 and 226 which respectively receive the horizontal and vertical sync signals HSYNC and VSYNC are added, the $\overline{Q}$ outputs from the FFs 225 and 226 are supplied to an exclusive OR (XOR) gate 228, an output from the XOR gate 228 is supplied to another XOR gate 227 to be subjected to an exclusive OR operation with the $\overline{Q}$ output from the FF 221, thereby preparing a signal HCLK. The $\overline{Q}$ outputs from the FFs 225 and 226 are fed back to the D input terminals thereof, respectively, so that the $\overline{Q}$ outputs are inverted every time the clocks are entered, respectively. Therefore, the signal HCLK is inverted every time the clock HSYNC or VSYNC is supplied.

FIGS. 5A to 5F show a timing chart for explaining the video signal converter according to the second embodiment. The dotted lines of the waveform of the signal HCLK of FIG. 5B indicate the inverted timings thereof. When the signal HCLK is inverted, the signal S (FIG. 5E) and the signal C-VD0 (FIG. 5F) are inverted for (C1,C0)=(0,1). Therefore, the dot skip position is inverted on the screen of the display unit for every raster scanning or frame scanning. Even if the dot skip is performed for every one dot display interval, the inversion is performed for every horizontal raster or vertical frame. As a result, the luminance of the displayed dot is averaged on the screen so that the observer cannot visually recognize dot skip for every one dot clock interval. It should be noted that one of the $\overline{Q}$ outputs from the FFs 225 and 226 may be supplied to the XOR 227 to perform the dot skip for only horizontal raster or vertical frame.

A display control apparatus for performing multicolor display by dot skip for every other dot according to a third embodiment of the present invention will now be described.

Figure 6:
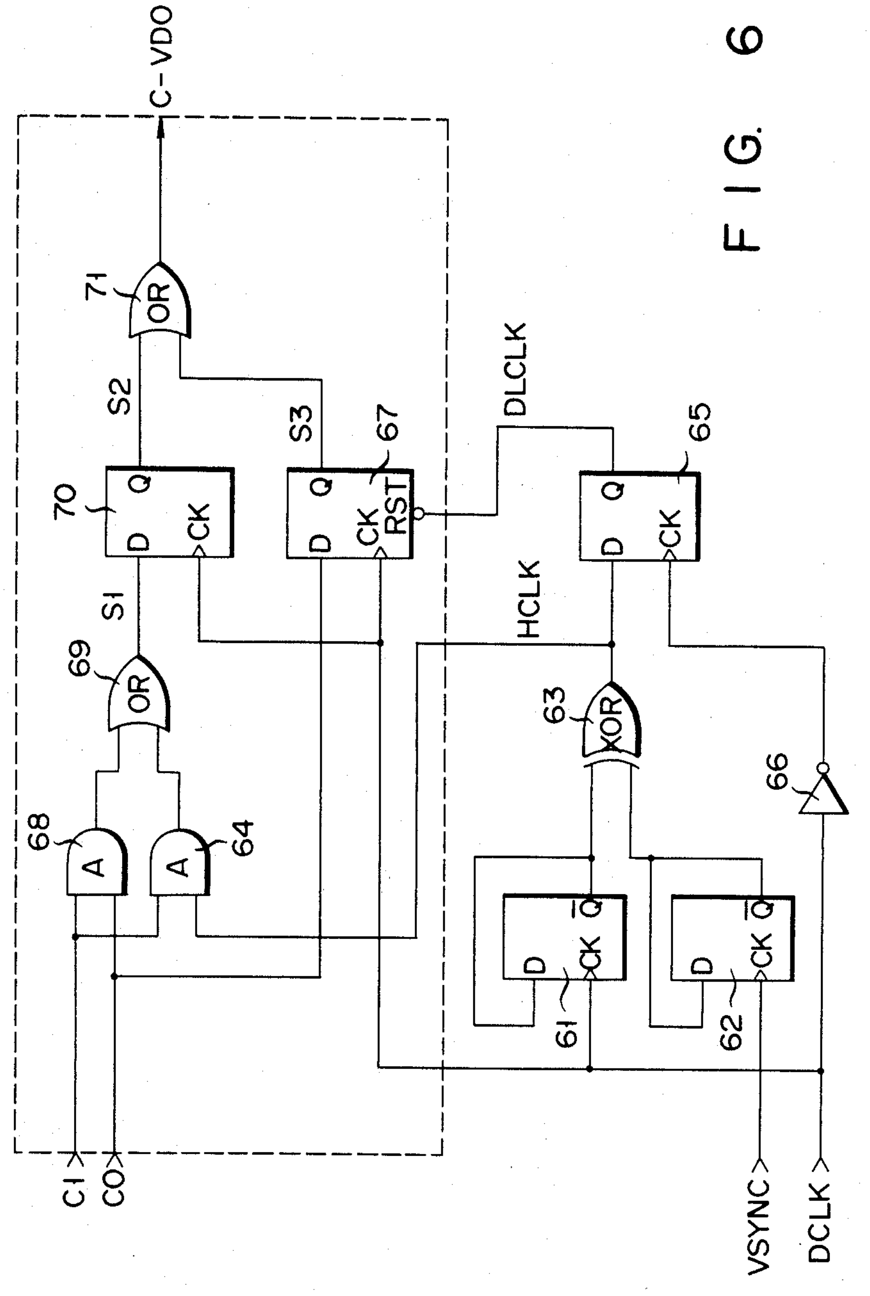
FIG. 6 is a circuit diagram of a video signal converter of a display control apparatus according to a third embodiment of the present invention.

FIG. 6 is a circuit diagram of a section corresponding to the video signal converter 22 of FIG. 2. The circuit surrounded by the dotted line is provided for each primary color element. In the same manner as in FIG. 4, 2-bit luminance data of the respective primary colors are given to be C1 and C0, and the binary output signal is given to be C-VD0.

A dot clock DCLK is supplied to a clock input terminal CK of a D flip-flop (FF) 61. The $\overline{Q}$ output from the FF 61 is fed back to the D input terminal thereof. This connection causes the FF 61 to serve as a binary counter. The $\overline{Q}$ output from the FF 61 corresponds to a signal obtained by frequency-dividing the clock DCLK by two. Similarly, a D flip-flop (FF) 62 serves as a binary couner. The $\overline{Q}$ output from the FF 62 corresponds to a signal obtained by frequency-dividing the signal VSYNC by two. The $\overline{Q}$ outputs from the FFs 61 and 62 are logically exclusive-ORed by an XOR gate 63. An output HCLK from the XOR gate 63 has a frequency half that of the clock DCLK. The signal HCLK is inverted in response to the signal VSYNC. FIGS. 7A to 7I show a timing chart for explaining the operation of the video signal converter. Referring to FIG. 7B, the signal HCLK is inverted in response to the signal VSYNC or for every vertical frame. The signal HCLK is supplied to an AND gate 64 and the D input terminal of an FF 65. An inverted signal of the signal DCLK (FIG. 7C) from an inverter 66 is supplied to the CK terminal of the FF 65. Therefore, the Q output DLCLK from the FF 65 becomes a signal obtained such that the signal HCLK is delayed by half of the dot clock period. The signal DLCLK is supplied to a reset terminal RST of an FF 67. The luminance data signals C1 and C0 (FIGS. 7D and 7E) are supplied to an AND gate 68. The signal C1 is also supplied to the AND gate 64. The signal C0 is also supplied to the D input terminal of the FF 67. Outputs from the AND gates 68 and 64 are supplied to an OR gate 69. An output signal S1 from the OR gate 69 is supplied to the D input terminal of an FF 70. The signal DCLK is supplied to the CK terminals of the FFs 67 and 70. Therefore, the signals C0 and S1 (FIG. 7F) appear at the Q output terminals of the FFs 67 and 70 when the signal DCLK is set at logic "1". The Q outputs from the FFs 67 and 70 will be referred to as signals S3 and S2, respectively. The signals S2 and S3 (FIGS. 7G and 7H) are supplied to an OR gate 71. An output from the OR gate 71 appears as the binary video signal C-VD0.

Figure 7:
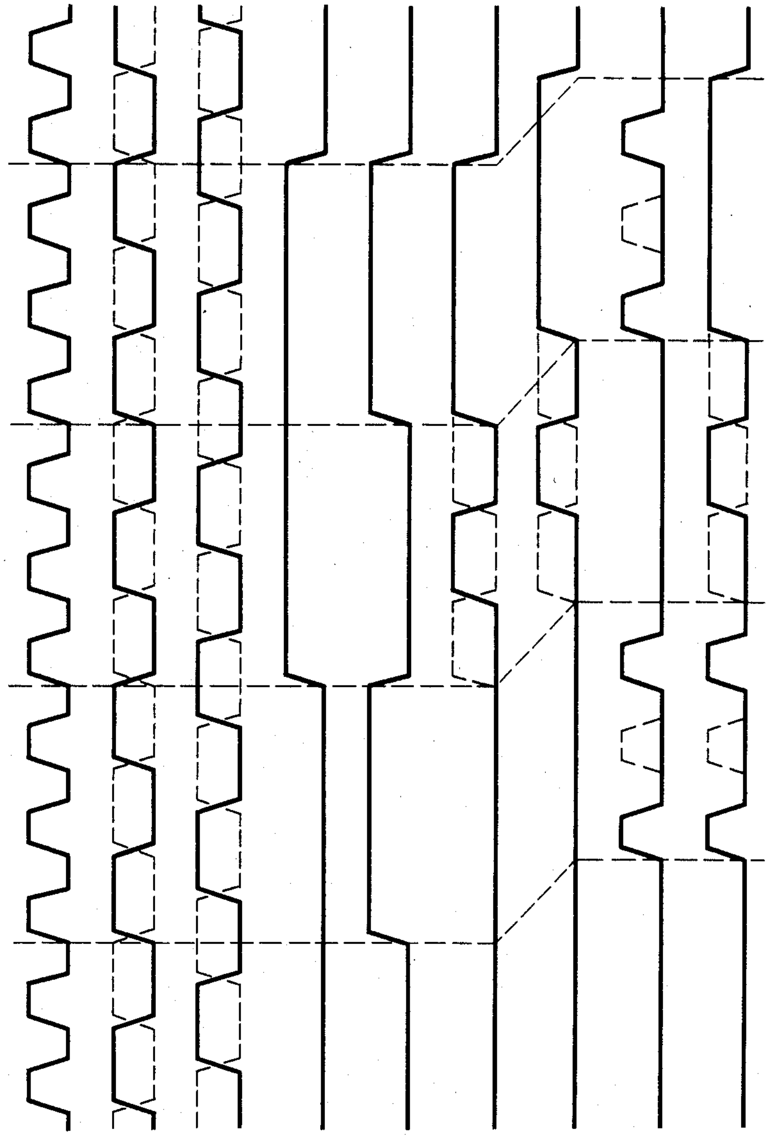

The operation of the video signal converter of FIG. 3 will be described with reference to FIG. 7.

When (C1,C0)=(0,0) (FIGS. 7D and 7E), the signals S1 (FIG. 7F) and the signal C0 (FIG. 7F) which are supplied to the D terminals of the FFs 67 and 70 are set to be both logic "0". Therefore, the signals S2 and S3 (FIGS. 7G and 7H) are set at logic "0" and the output signal C-VD0 (FIG. 7I) is set at logic "0". As a result, the corresponding color element is not displayed at the display unit.

When the condition (C1,C0)=(0,1) is established, the D input terminal of the FF 67 is set at logic "1". In this case, when the signal DLCLK (FIG. 7C) is set at logic "1", the signal S3 goes to logic "1" when the signal DCLK (FIG. 7A) rises. When the signal S3 is set at logic "1", the signal DLCLK becomes logic "0" at the trailing edge of the signal DCLK. As a result, a signal having a period half that of the signal DCLK appears as the output signal C-VD0. When the state (C1,C0)=(0,1) continues longer than the 2-dot display interval, the signal DLCLK is set at logic "0" at the leading edge of the signal DCLK immediately after the output signal C-VD0 goes to logic "1". Therefore, at the next dot clock timing, the signal DLCLK is set at logic "0". Therefore, when the state (C1,C0)=(0,1) continues longer than the 2-dot display interval, the signal having the period substantially half that of the signal DCLK is enabled/disabled at one-dot display intervals. In addition, since the signal DLCLK is inverted for every vertical frame, the dot skip position is inverted for every vertical frame.

When the condition (C1,C0)=(1,0) is established, the signal S1 is set at logic "1" while the signal HCLK is set at logic "1". In this case, when the signal DCLK rises, the signal S2 is set at logic "1". In other words, the output signal C-VD0 is set at logic "1". However, when the signal DCLK rises next time, the signal S1 has been kept at logic "0", so that the signals S2 and C-VD0 are set at logic "0". Therefore, a signal having the same logic "1" period as that of the signal DCLK appears as the output signal C-VD0. When the state (C1,C0)=(0,1) continues longer than the 2-dot display interval, the signal S1 is held at logic "0" at the leading edge of the signal DCLK immediately after the output signal C-VD0 is set at logic "1". As a result, a signal having the same logic "1" period as that of the signal DCLK is enabled/disabled at one-dot display intervals. In addition, the signal HCLK is inverted for every vertical frame, so that the dot skip position is inverted for every vertical frame.

Finally, when the state (C1,C0)=(1,1) is established, the signal S1 is held at logic "1" as long as the condition (C1,C0)=(1,1) is maintained. Therefore, the output signal C-VD0 is kept at logic "1" during the period of the condition (C1,C0)=(1,1).

According to this embodiment as described above, when the luminance data signals (0,0), (0,1), (1,0) and (1,1) are supplied, binary video signals with four different duty ratios are obtained. These video signals are displayed on the screen at the display unit, and the 4-level gradation as the average luminance levels of the corresponding color elements is obtained, so that 64 colors (=$4^3$) can be displayed by three primary colors RE, BL and GR. It should be noted that the dot skip is performed for every vertical frame in order to average the influence of the dot skip. Therefore, the inversion need not be performed, unlike in the first embodiment. The signal HSYNC may be supplied to the clock terminal CK of the FF 62 to invert the signal HCLK for every horizontal raster. In addition, the signal HCLK may be inverted by either of the signals HSYNC and VSYNC, as described with reference to the second embodiment.

The dot skip interval may be arbitrarily selected unless the two dots displayed on the screen are recognized as two separate dots.

Figure 8:
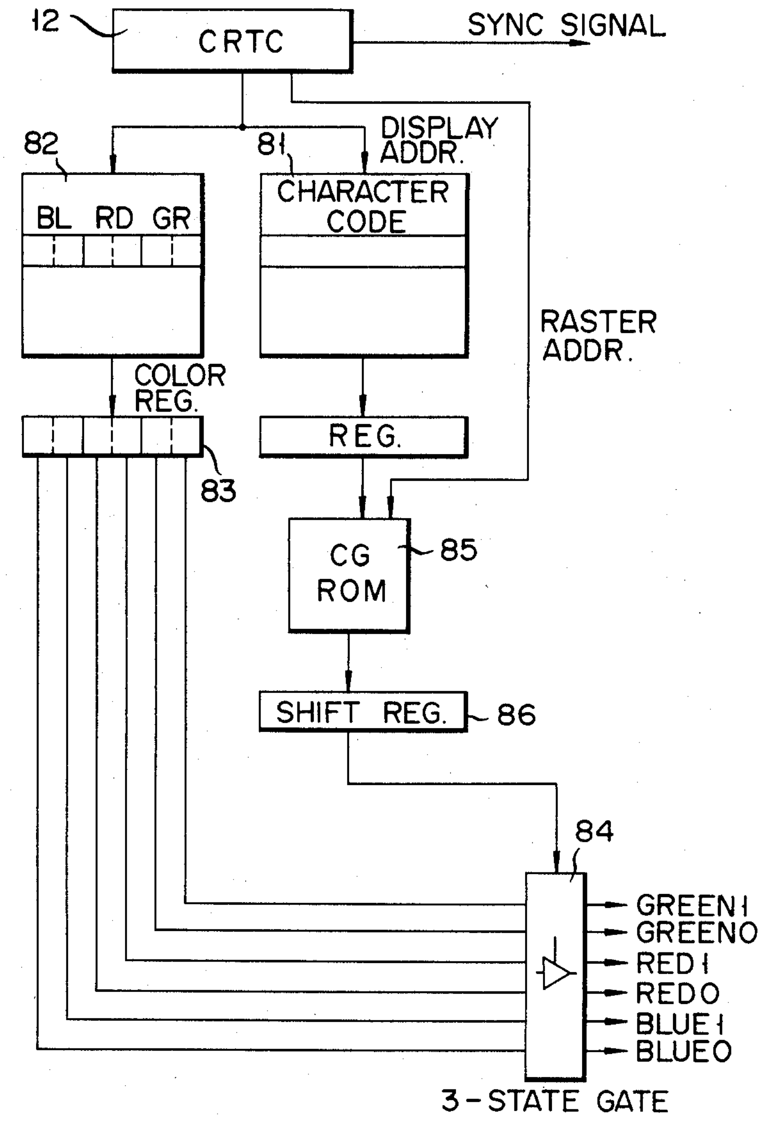
FIG. 8 is a block diagram of a memory for storing luminance signals of the color elements in units of characters.

A memory for storing luminance data of the respective color elements may comprise a memory 82 for storing color data in correspondence with the respective addresses of a memory 81 for storing character codes, as shown in FIG. 8. The memory shown in FIG. 8 is a known circuit, and a detailed description thereof will be omitted. Outputs from a color register 83 are supplied to a tristate gate circuit 84 and is gated thereby in response to a signal obtained such that an output from a character generator (CG) ROM 85 is converted by a shift register 86 to the serial data. The tristate gate 84 then generates color signals. These color signals are supplied to the video control circuit 14 of the present invention.

Figure 9:
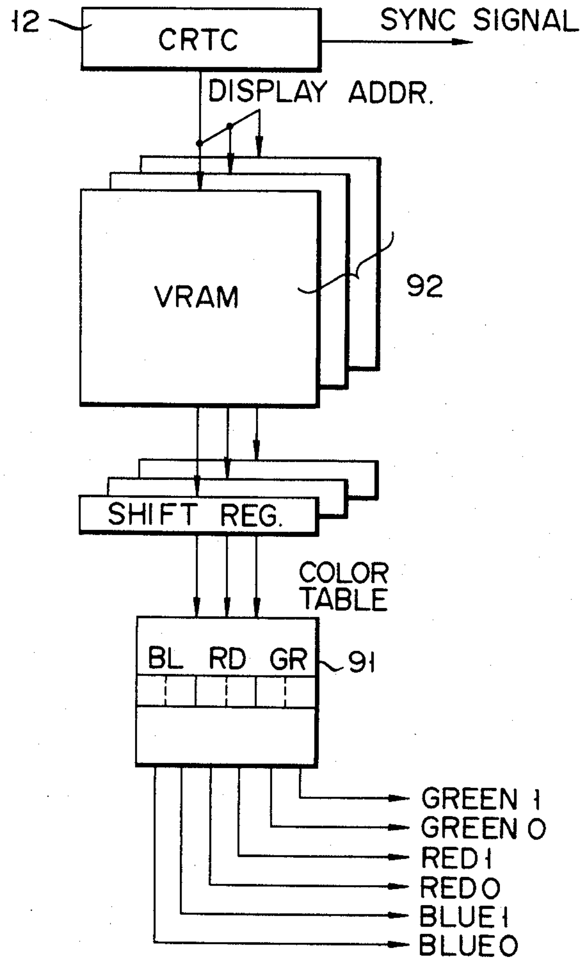
FIG. 9 is a block diagram of a memory for storing luminance signals by utilizing a color table.

The color signals may be generated by using a color table (color look-up table or pallet memory) 91 shown in FIG. 9. The contents of the color table 91 can be updated by a CPU. In this case, the data stored in a VRAM 92 are used as address signals to access the color table 91. The color table 91 comprises an 8-word memory. By utilizing the color table 91, additional color data can be stored without increasing the number of planes (storage capacity) of the VRAM 92. In addition, since the contents of the color table 91 can be updated under the control of the CPU, the screen color can be instantaneously changed. It should noted that the circuit shown in FIG. 9 has a known arrangement, and a detailed operational description thereof will be omitted. The outputs from the color table is supplied to the video control circuit 14 of the present invention.

What is claimed is:

1. A display control apparatus for displaying more than $2^n$ colors on a screen of a raster scan type color display unit having only n binary color-element signal inputs, where n is an integer larger than 1, comprising:

memory means for storing luminance data corresponding to each of n color elements, to specify respective colors for each of a plurality of dots on the screen, each dot including a plurality of pixels;

clock signal generating means for generating a clock signal synchronized with a display of the dots on the screen, and within one clock period of which said plurality of pixels in each dot are displayed on the screen;

luminance data read out means for supplying address signals to said memory means and for reading out the luminance data of the respective color elements in response to the clock signal; and video signal controlling means for generating at least three states of a binary color-element signal for each of n color elements in one-dot display period in response to the luminance data for the color element for each dot, and for transmitting the binary color-element signals to the corresponding inputs of the display unit, said states for each color element including a first state wherein the color-element signal is absent for all pixels in one dot, a second state wherein the binary color-element signal is generated at intervals of at least one-pixel display in the one dot-display period, and third state wherein the binary color element signal is generated for all pixels in one dot.

2. An apparatus according to claim 1, further comprising means for generating a horizontal synchronizing signal for raster scanning, and wherein said video signal controlling means receives the horizontal synchronizing signal and reverses pixel positions in one dot where each color-element signal is generated for every raster scan in response to the horizontal synchronizing signal.

3. An apparatus according to claim 1, further comprising means for generating a vertical synchronizing signal for frame scanning, and wherein said video signal controlling means receives the vertical synchronizing signal and reverses pixel positions in one dot where each color-element signal is generated for every frame scan in response to the vertical synchronizing signal.

4. An apparatus according to claim 1, further comprising means for generating a horizontal synchronizing signal for raster scanning and means for generating a vertical synchronizing signal for frame scanning, and wherein said video signal controlling means receives the horizontal and vertical synchronizing signals and reverses pixel positions in one dot where each color-element signal is generated for every raster and frame scan in response to the horizontal and vertical synchronizing signals.

5. An apparatus according to claim 1, wherein said video signal controlling means comprises means for controlling a pulse width of the binary color-element signal for each color element of each pixel in one dot in accordance with the luminance data of respective color elements which are read out from said memory means by said read out means.

* * * * *